(12) United States Patent
Li et al.

(10) Patent No.: US 7,508,841 B2
(45) Date of Patent: Mar. 24, 2009

(54) ENHANCED LANGUAGE SUPPORT FOR LEGACY CALL CONTROL SYSTEM

(75) Inventors: Guang Li, Ottawa (CA); Paul Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 768 days.

(21) Appl. No.: 11/128,004

(22) Filed: May 12, 2005

(65) Prior Publication Data

US 2005/0271081 A1 Dec. 8, 2005

(30) Foreign Application Priority Data

Jun. 3, 2004 (GB) .................................. 0412424.4

(51) Int. Cl.
*H04J 3/16* (2006.01)
*H04L 12/66* (2006.01)
*G10L 11/00* (2006.01)

(52) U.S. Cl. ...................... 370/466; 370/465; 370/352; 704/277

(58) Field of Classification Search ................. 370/352, 370/465, 466; 704/277
See application file for complete search history.

(56) References Cited

U.S. PATENT DOCUMENTS

| | | | | |
|---|---|---|---|---|
| 5,784,069 A | * | 7/1998 | Daniels et al. | 345/467 |
| 6,411,696 B1 | * | 6/2002 | Iverson et al. | 379/201.06 |
| 6,438,220 B1 | * | 8/2002 | Liu | 379/144.01 |
| 6,484,309 B2 | * | 11/2002 | Nowlin et al. | 717/100 |
| 6,601,108 B1 | | 7/2003 | Marmor | |
| 6,967,655 B1 | * | 11/2005 | Goto | 345/467 |
| 7,379,981 B2 | * | 5/2008 | Elliott et al. | 709/220 |
| 2002/0150230 A1 | | 10/2002 | Fang | |
| 2003/0072330 A1 | | 4/2003 | Yang et al. | |

OTHER PUBLICATIONS

Falstrom et al. entitled "Internationalizing Domain Names in Applications (IDNA)", IETF Standard, Internet Engineering Task Force, IETF, CH, Mar. 2003, XP01500273 ISSN: 0000-0003; pp. 1-22.

* cited by examiner

*Primary Examiner*—Firmin Backer
*Assistant Examiner*—Nittaya Juntima

(57) ABSTRACT

This invention provides a method and apparatus for incorporation with a non-modifiable legacy IP telephony call control system. The system generally includes a legacy call control system for receiving incoming events and legacy strings and, in response, outputs resulting events and the legacy strings. An adapter generates the legacy strings and passes the incoming events and corresponding legacy strings to the legacy call control system.

8 Claims, 6 Drawing Sheets

ENHANCED LANGUAGE SUPPORT FOR LEGACY CALL CONTROL SYSTEM

FIELD OF THE INVENTION

This invention relates to an IP telephony call control system, and more particularly to a method and apparatus for adapting a legacy call control system for additional language support, where the legacy system supports a limited, predefined character set.

BACKGROUND OF THE INVENTION

In order to derive the fullest benefit, it is desirable to deploy a given technology to the broadest audience possible. In the emerging global marketplace, it is a prerequisite for local sales, that a technology support local languages.

IP telephony is a complex technology that requires a long development cycle and incurs high development costs. Part of the value of such a complex technology is derived from deployment maturity. A mature complex technology equates to a stable technology, with relatively lower risk and higher ease of deployment.

However, many current mature IP telephony systems were designed before the market for such technology was ripe, globally. As a result, these systems were designed without the ability to support the linguistic character sets of many prospective customers. Current systems support ASCII characters, which do not enable certain characters, which are, conversely, available in Unicode.

A legacy system is defined as a system that was developed many years ago, and is still used in business because of its value to the business and the high risk and cost to modify it or replace it with a contemporary system. An example of such a legacy system is the call control system in IP telephone switches. Call control systems are highly complex systems, typically requiring high investment costs to develop, and years to become stable/mature enough to be deployable. As a result, legacy call control systems are still used in many modern IP telephone switches.

It is highly desirable to adapt IP telephony call control systems to support additional character sets, so as to provide the same functions as the original system and perform those functions with strings of a newly introduced language.

In the past, additional character sets have been supported by modifying the code-base of the technology to incorporate additional, or alternate, characters. However, this approach has the drawback of undermining the maturity of the code. Without the history of deployment associated with the original code-base, there is a greater risk of instability. As a result, the full confidence in such a system is compromised.

What is needed is incorporation, with a legacy IP telephony call control system, of additional language character support, that further, does not compromise the maturity of the legacy system. It would be of additional benefit if such character support could be introduced in runtime.

SUMMARY OF THE INVENTION

It is an object of an aspect to provide a call control system that combines the stability of a mature legacy call control system, while also providing language support not included in the legacy system.

Therefore, according to an embodiment of the present invention, a call control system is provided for incorporation in an IP telephony switch, comprising a legacy call control system for inputing incoming events, and legacy strings, and, in response, outputting resulting events and, legacy strings. The system also comprises an adapter for inputing incoming events and alternate strings. The adapter generates the legacy strings, corresponding to the alternate strings, passes the incoming events and corresponding legacy strings to the legacy call control system, and receives, from the legacy call control system, the resulting events and said corresponding legacy strings. The adapter also identifies, using the received corresponding legacy strings, the alternate strings, and outputs the resulting events and the alternate strings.

BRIEF DESCRIPTION OF THE DRAWINGS

A detailed description of the preferred embodiment(s) of the present invention is provided herein below with reference to the accompanying drawings in which.

BRIEF DESCRIPTION OF THE PREFERRED EMBODIMENT(S)

Figure 1:
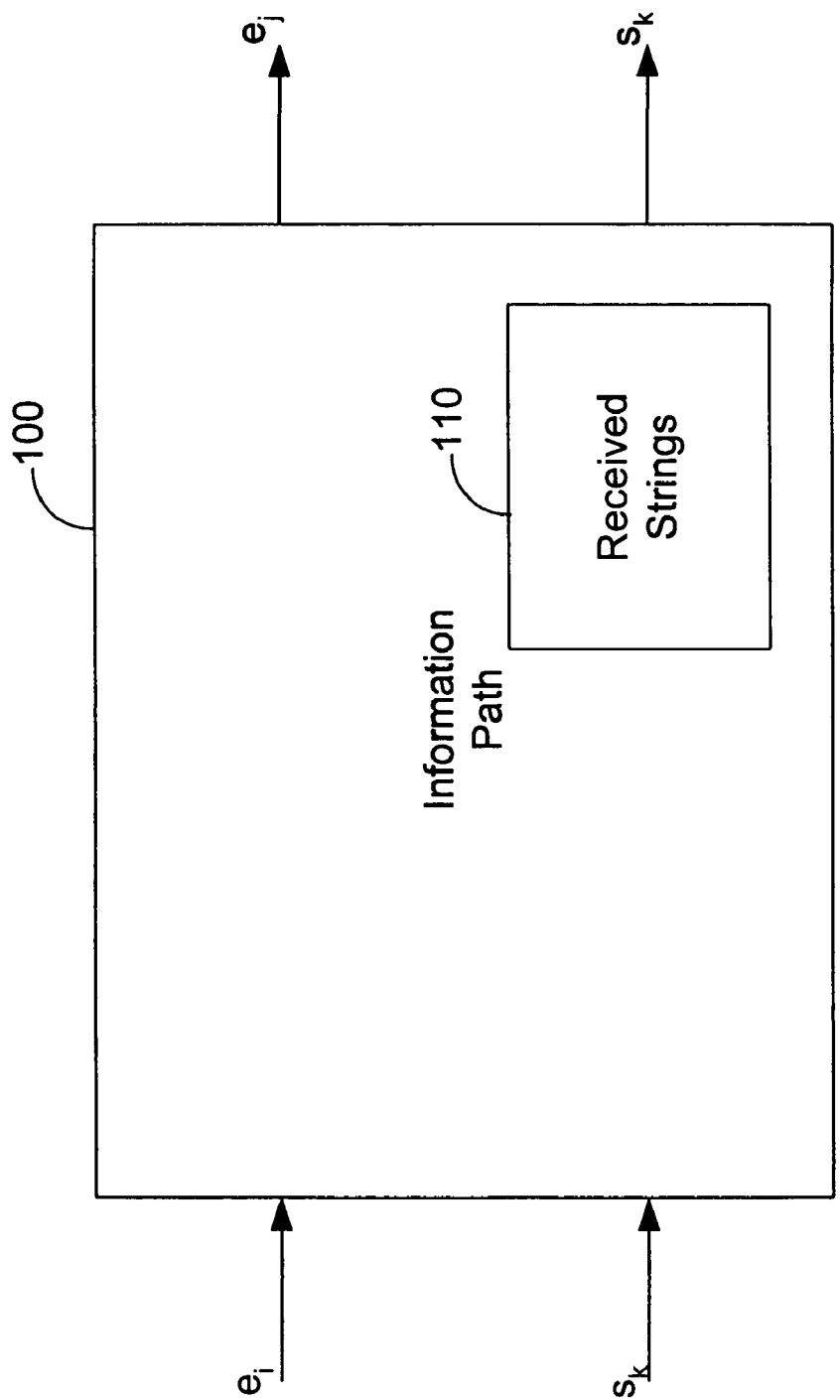
FIG. 1 shows a model of an information path.
Figure 2:
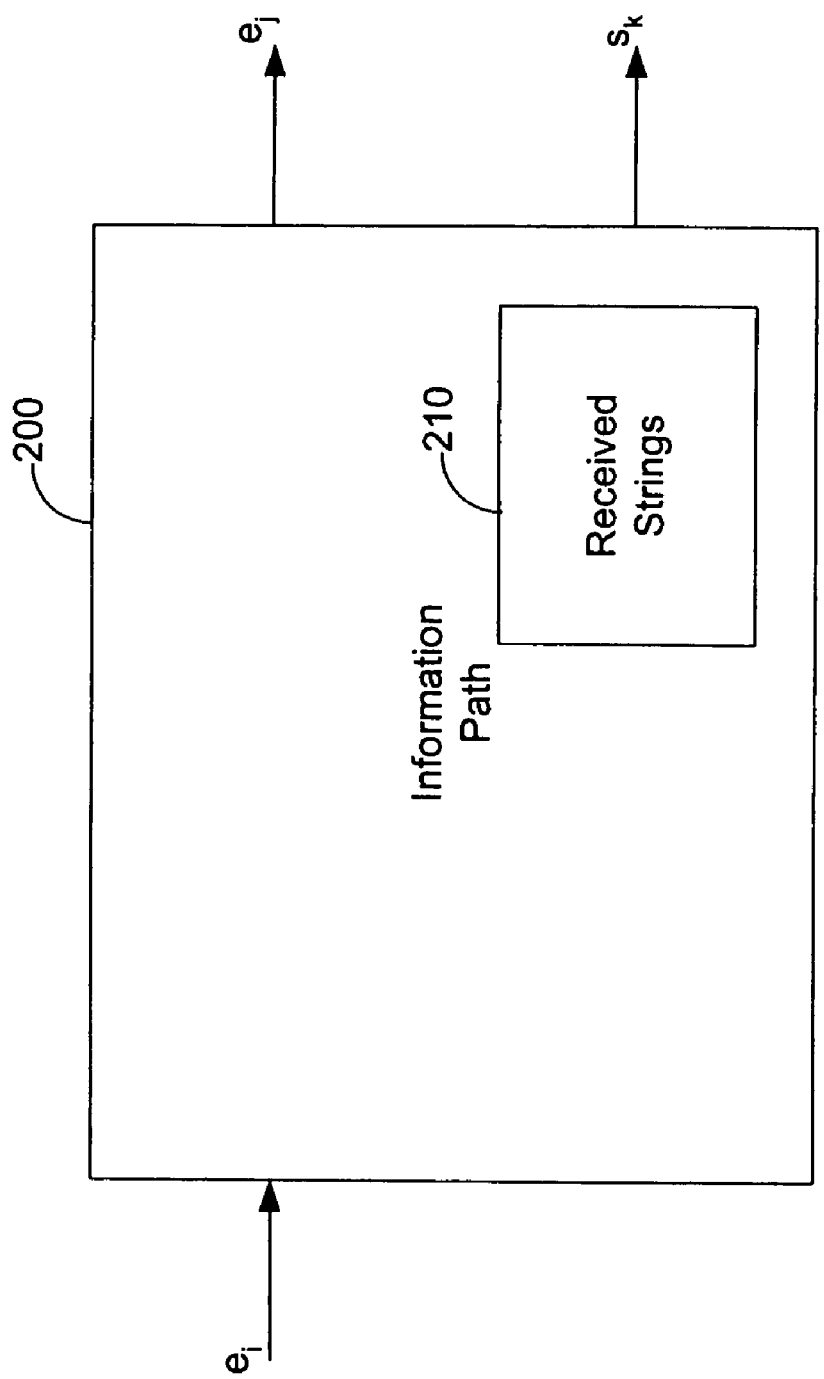
FIG. 2 shows the model of FIG. 1 where $s_k$ is previously stored in memory.

The concept of an information path is introduced to describe paths through which events and strings flow, such as provided by a legacy call control system. An information path can be modeled as a functional block that converts input to output. Regardless of the actual embodiment, an information path contains at least one processing unit that performs information conversion. As shown in FIG. 1, information path 100 receives an event, $e_i$, and a string $s_k$ and generates in response to the input $<e_i, s_k>$ an event $e_j$, and a string $s_k$; where $e_i \neq e_j$. The information path 100 has a memory of previously received strings 110. As illustrated in FIG. 2, once $s_k$ is stored in the memory 210, an input consisting of only $e_i$ can trigger information path 200 to generate output $<e_j, s_k>$.

Assuming that E={ei} is the set of all events that an information path 100 can receive and generate, and S={$s_k$} is the set of all strings that the information path 100 can receive and retrieve from its memory, then, for a given E, the ability of information path 100 to handle received input is constrained by S.

When an information path contains multiple processing units, connected with each other in a cascade, each processing unit can be modelled as an information path. An information path is said to be an atomic information path if and only if it contains only one processing unit that can not be decomposed into information paths in a finer granularity. The character set capacity of an information path determines the scope of processing capability with respect to what strings may be handled.

As discussed above, legacy call control systems were developed at a time when there was not an obvious need for supporting multiple languages. Depending on the language, the call control system may not be modifiable to support a given language. An atomic information path P is defined as not modifiable if P can not be modified to handle all $s_n \in S^*$, where $S \subset S^*$ and $S^* - S \neq \emptyset$, or $S \not\subset S^*$ and $S^* \not\subset S$ and $S^* \cap S = \emptyset$. Thus, there is a requirement for changing an information path 100 to support the handling of all $s_n \in S^*$, without modifying that path 100.

Figure 3:
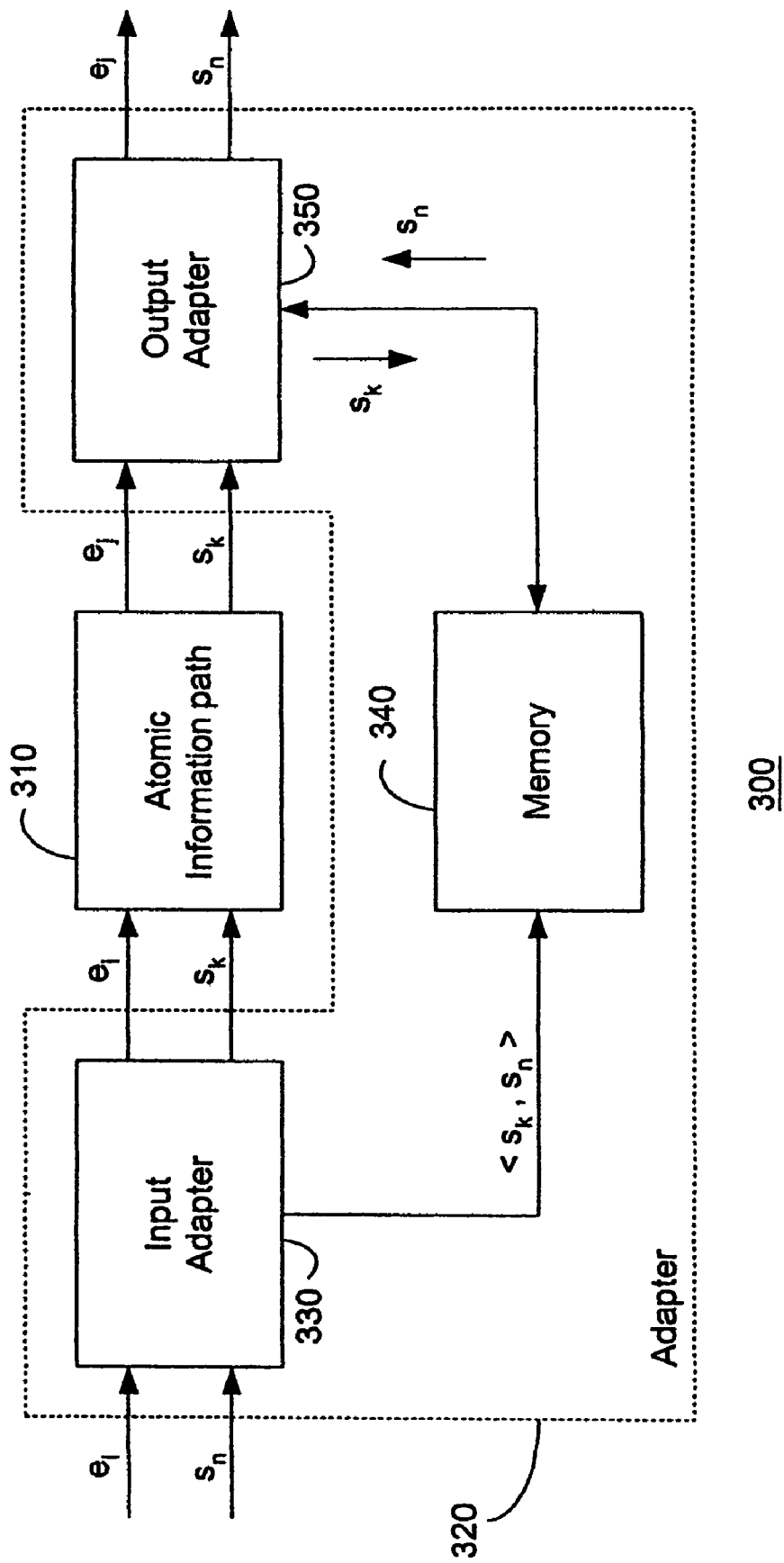
FIG. 3 shows an information path transformation of an non-modifiable legacy information path according to an aspect of the present invention.

An atomic information path 310, that is not modifiable, can be adapted into a modifiable information path by using the transformation method as illustrated in FIG. 3. In this method, the path 310 is wrapped with an adapter 320 formed of an input adapter 330, memory 340, and output adapter that, in combination, facilitate the transformation.

Input adapter 330 receives $e_i \in E$ and $s_n \in S^*$ as input and generates $<e_i, s_k>$ as the input to path 310, where $s_k \in S$. In adapter 330, a one to one mapping f can be used to generate $s_n$ from $s_k$.

Memory 340 is used to store $<s_k, s_n>$ such that the content in memory 340 can be later retrieved by using $s_k$ as a key.

Output adapter 350 receives $<e_j, s_k>$ as input and generates $<e_j, s_n>$ as the corresponding output. This process uses $f^1$ the reverse function of f to map $s_k$ back to $s_n$. It should be noted that if $f^1$ can be mathematically determined from f, memory 340 is not needed; otherwise, $s_k$ received from path 310 can be used as a key to retrieve $s_n$ from memory 340.

Initially, the information path 310 is not modifiable. The transformation wraps path 310 with the input adapter 330, output adapter 350, and memory 340. After the transformation, a new information path 300 is formulated that consists of path 310, and adapter 320.

Thus, the information path of FIG. 3 is a modifiable information path to the upstream component that sends $<e_i, s_n>$ and to the downstream component that receives $<e_j, s_n>$. For the case illustrated in FIG. 2, the information path takes $e_i$ as input and generates $<e_j, s_n>$ as the corresponding output.

This method of FIG. 3 is bound by certain constraints: Specifically, Assuming that $S = A \cup A^2 \cup A^3 \cup \ldots \cup A^m$ and $S^* = B \cup B^2 \cup B^3 \cup \ldots \cup B^n$, where $A^2 = A \times A, \ldots$, wherein A is the character set based on which all $s_k \in S$ are composed, and B is the character set based on which all $s_j \in S^*$ are composed, if $A \neq B$ and $A \cap B = \emptyset$, then $S \not\subset S^*$, $S^* \not\subset S$, $S \cap S^* = \emptyset$. In this case, by properly choosing m and n so that $|S| \geq |S^*|$, a one to one mapping $f(s_j) \to s_k$ can be determined. If $A \neq B$ and $A \cap B \neq \emptyset$, then $S \cap S^* \neq \emptyset$. In this case, for $s_j \in S^*$ and $s_j \in S$, the one to one mapping f should satisfy $f(s_j) \to s_j$; and for $s_j \in S^*$ and $s_j \notin S$, the mapping f should satisfy $f(s_j) \to s_k$, where $s_k \in S$.

Many legacy systems can be modeled by using the non-modifiable information path defined above. As discussed above, a complex system may contain many information paths. Thus, according to the above method, a complex system with a legacy system as the main component may retain the legacy system in many of its information paths.

Figure 4:
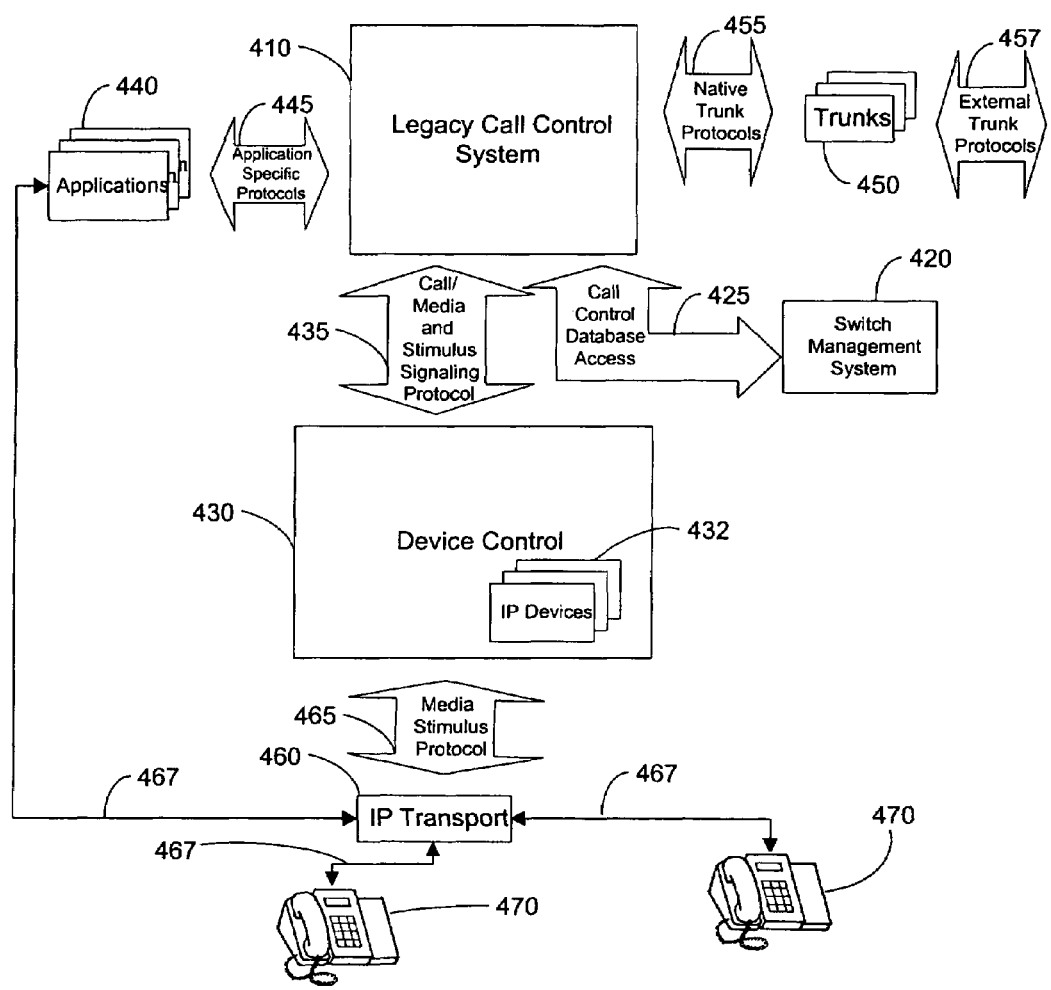
FIG. 4 shows a block diagram of an IP telephone switch using a legacy call control system.

An IP telephone switch is a complex system. A typical IP telephone switch incorporating a legacy call control system 410 is illustrated in FIG. 4. The legacy call control system only accepts strings in Extended ASCII as input and generates strings in Extended ASCII as output.

The call control system is coupled to switch management system 420, device control 430, applications 440 and trunks 450 by, respectively, call control database access 425, call/media and stimulus signaling protocol 435, application specific protocols 445, and native trunk protocols 455.

Device control 430 is further coupled to IP transport 460 via Media stimulus control protocol 465. Device control 430 may incorporate IP devices 432. The trunks 450 are coupled externally via external trunk protocols 457. IP transport 460 may communicate with applications 440 or devices such as IP telephones 470 via Media stimulus control protocol messages 467.

In the IP telephone switch as shown in FIG. 4, the following paths can be defined as information paths of the type identified above as information path 100:

i. Switch Management System 420→Call Control system 410→Device Control 430→IP telephones 470 ii. Switch Management System 420→Call Control system 410→Switch Management System 420 iii. Switch Management System 420→Call Control system 410→Applications 440 iv. Trunks 450→Call Control system 410→Device Control 430→IP telephones 470

The following paths can be defined as information paths of the type identified above as information path 200:

v. IP telephones 470→Device Control 430→Call Control system 410→Trunks 450 vi. IP telephones 470→Device Control 430→Call Control system 410→Applications 440 vii. IP telephone 470→Device Control 430→Call Control system 410→Device Control 430→IP telephone 470 viii. Application 440→Call Control system 410→Device Control 430→IP telephone 470 ix. Application 440→Call Control system 410→Trunks 450

There is a requirement to modify the IP telephone switch shown in FIG. 4, to support display in IP telephones 470 and applications 440 in multiple languages. In the art, the contemporary approach to multiple language display on an electronic display panel is the use of the Unicode based coding scheme.

Adapting the information path theory set forth above to these circumstances, S denotes the set of strings in Extended ASCII; $S^*$ denotes the set of strings in Unicode.

None of the information paths, listed i. through viii. above, for the IP telephone switch shown in FIG. 4, is modifiable to support display on IP telephones 470 of languages in Unicode. This is because the legacy call control system 410 is not modifiable to support strings in Unicode. For these information paths, the legacy call control system 410 is the only information path that is atomic and not modifiable.

Figure 5:
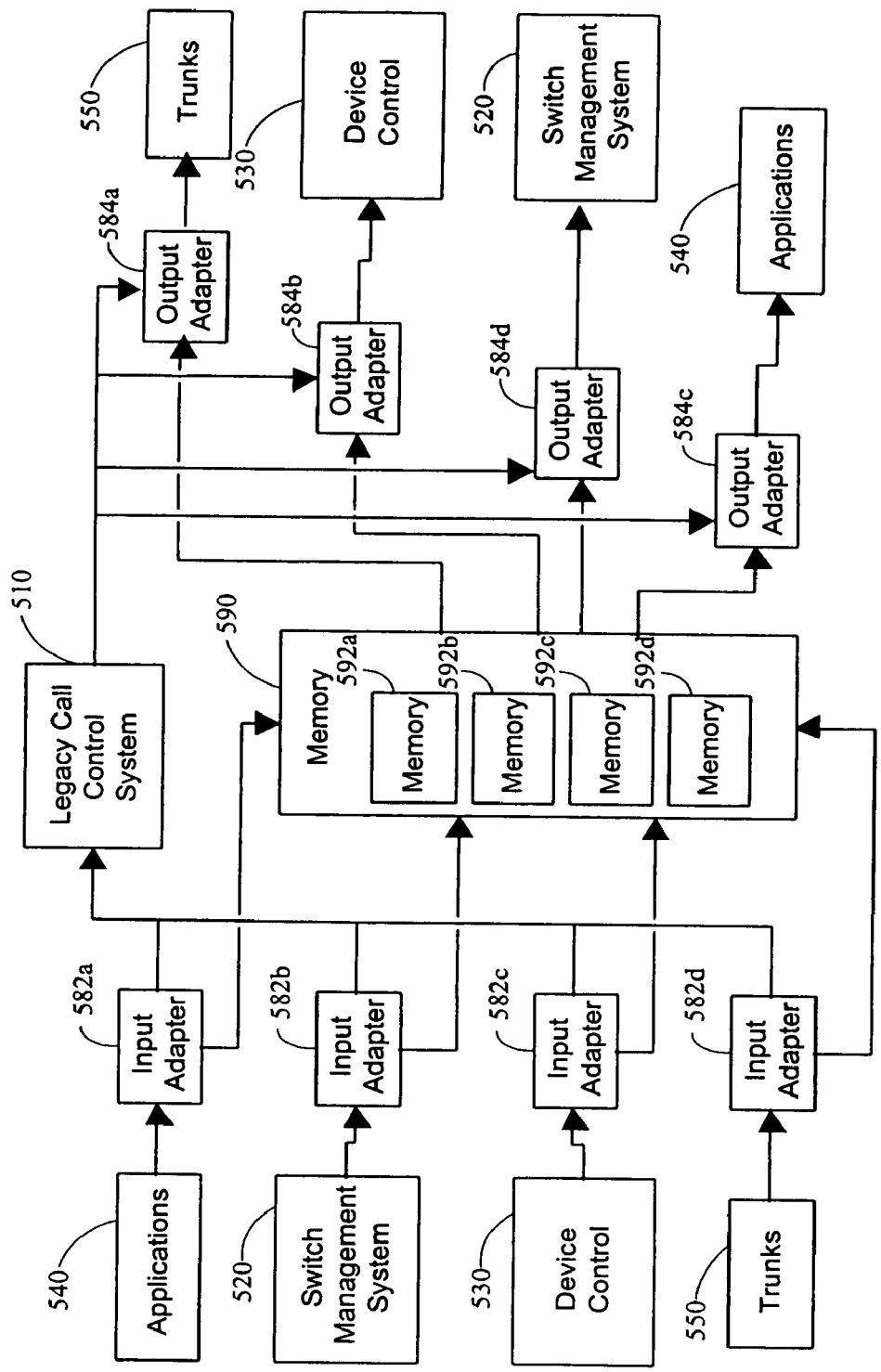
FIG. 5 shows a system for transforming a generic IP telephone switch for multiple information paths according to the transformation principles of FIG. 3.

Referring to FIG. 5 there is shown a IP telephone switch that applies the principles of path modification discussed in reference to the paths of FIG. 3, to the switch of FIG. 4. The switch illustrated in FIG. 5 has non-atomic information paths, discussed in greater detail below, corresponding to the paths i. through viii. of FIG. 4. These paths incorporate only one non-modifiable atomic information path i.e. legacy call control system 510 identical to system 410.

The transformation method described above is applied to all of the non-atomic information paths. Since the legacy call control system 510 is atomic and non-modifiable, the transformation method is applied at the system 510 (i.e. for each information path there is a corresponding adapter configured to system 510). Each component that sends events and strings to the call control system 510, is output coupled to the system 510 via an input adapter 582a through 582d (each as per adapter 330). Components that send events and strings to the call control system are the switch management system 520, device control 530, applications 540, and trunks 550.

Each component that receives events and strings from call control 510, is input coupled thereto via an output adapter 584a through 584d (each as per adapter 350 in FIG. 3). Components that receive events and strings from the Call Control System 510 are switch management system 520, device control 530, applications 540, and trunks 550.

Between the transformations applied to these information paths, there is a great similarity and content overlap in the use of memories. Therefore, memories 592a through 592d, associated with the four input adapters, can be aggregated into one memory service 590 that is coupled, at memory input, to the input adapters 582a through 582d and coupled, at memory output, to the output adapters 584a through 584d.

Thus, the non-atomic information paths referred to above, for FIG. 5, are as follows:

Path I: covered by input adapter 582b, output adapter 584b and memory 592b

Path II: covered by input adapter 582b, output adapter 584c and memory 592b

Path III: covered by input adapter 582d, output adapter 584b and memory 592d

Path IV: covered by input adapter 582c, output adapter 584a and memory 592c

Path V: covered by input adapter 582c, output adapter 584c and memory 592c

Path VI: covered by input adapter 582c, output adapter 584b and memory 592c

Path VII: covered by input adapter 582a, output adapter 584b and memory 592a

Path VIII: covered by input adapter 582a, output adapter 584a and memory 592a

Figure 6:
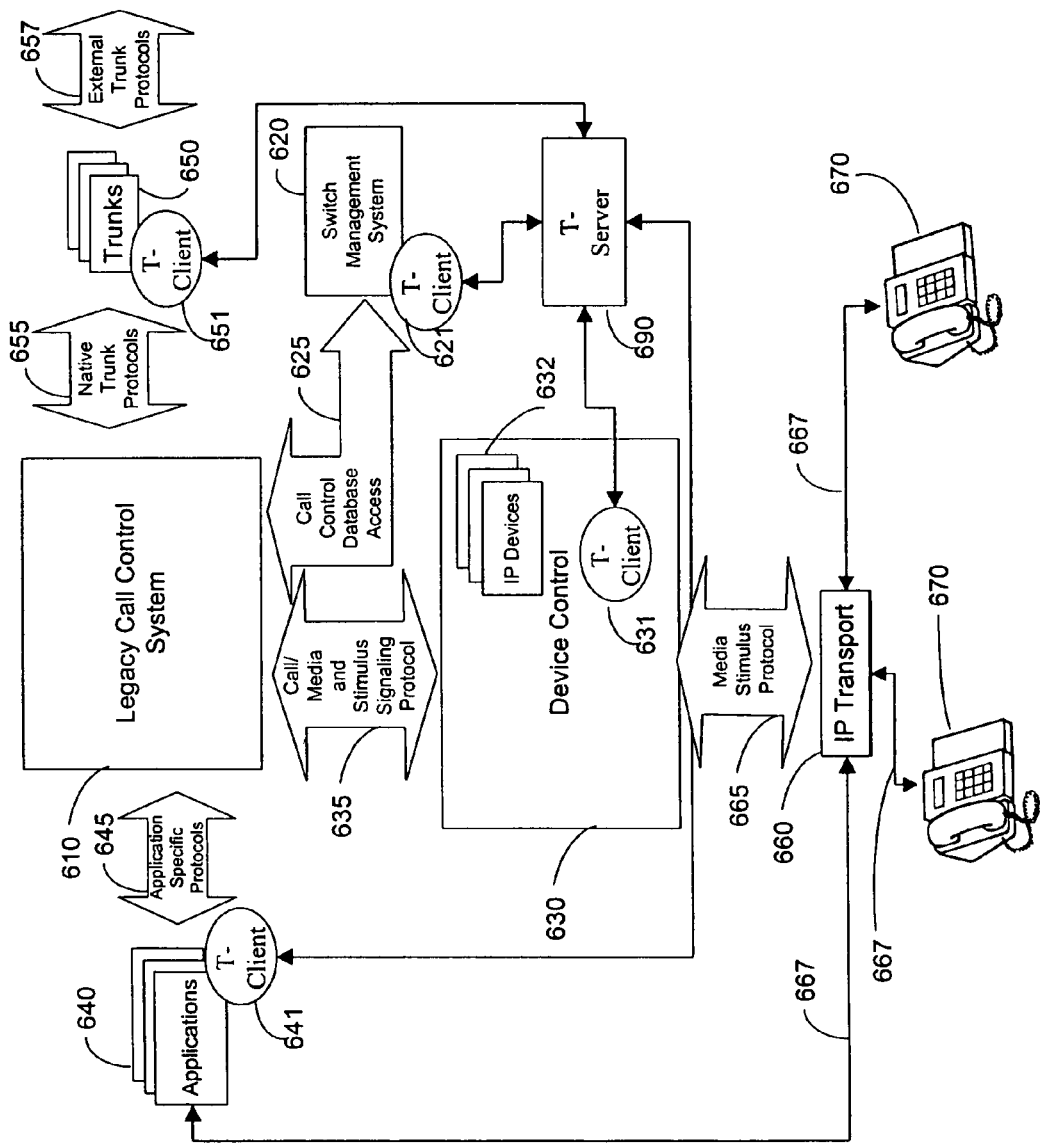
FIG. 6 shows an exemplary embodiment of an IP telephone switch using a legacy call control system, and modified according to the transformation principles of FIG. 3.

FIG. 6 shows an exemplary embodiment of an IP telephone switch according to the present invention, wherein the call control system 610 is coupled to switch management system 620, device control 630, applications 640 and trunks 650 by, respectively, call control database access 625, call/media and stimulus signaling protocol 635, application specific protocols 645, and native trunk protocols 655.

Device control 630 is further coupled to IP transport 660 via media stimulus control protocol 665. Device control 630 may incorporate IP devices 632. The trunks 650 are coupled externally via external trunk protocols 657. IP transport 660 may communicate with applications 640 or devices 670 via Media stimulus control protocol messages 667.

In the switch of FIG. 6, four T-clients 621, 631, 641 and 651 are provided, along with one T-Server 690 introduced as per the transformation of FIG. 5. Switch management system T-client 621 corresponds to input adapter 582b. Trunks T-client 651 corresponds to input adapter 582d and output adapter 584a. Device control T-client 631 corresponds to input adapter 582c and output adapter 584b Applications T-client 641 corresponds to input adapter 582a and output adapter 584c. T-Server 690 corresponds to the aggregated memory 590.

In this embodiment, each information path is served by an input adapter, an output adapter, and a memory. The adapters correspond to the respective T-Clients 621, 631, 641, or 651, and the memory corresponds to the T-server 690.

For any legacy system, if information paths contain atomic non-modifiable paths as defined above, and there is a requirement to adapt a character set to support the corresponding strings, the requirement can be fulfilled by using the method set forth herein above.

It will be appreciated that, although embodiments of the invention have been described and illustrated in detail, various modifications and changes may be made. Different implementations may be made by those familiar with the technology, without departing from the scope of the invention. It may be appreciated that aspects of the invention may be implemented separately, or co-operatively. Any such choice of implementation may be made without departing from the sphere and scope of the invention as described by the claims appended hereto.

What is claimed is:

1. A call control system for incorporation in an IP telephony switch, said system comprising:
   a legacy call control system for receiving incoming events and legacy strings and, in response, outputting resulting events and said legacy strings; and
   an adapter for, (i) receiving said incoming events and alternate strings, (ii) generating said legacy strings corresponding to said alternate strings, (iii) passing said incoming events and said corresponding legacy strings to said legacy call control system, (iv) receiving from said legacy call control system said resulting events and said corresponding legacy strings, (v) identifying said alternate strings using said received corresponding legacy strings and (vi) outputting said resulting events and said alternate strings.

2. The system of claim 1 wherein said adapter additionally stores pairs of said alternate strings and said corresponding legacy strings, for use in identifying said alternate strings.

3. The system of claim 2 wherein said adapter comprises a memory for storing said stored pairs.

4. The system of claim 1, wherein said adapter comprises:
   an input adapter for (i) said receiving of said incoming events and alternate strings, (ii) said generating of said legacy strings, and (iii) said passing of said incoming events and said corresponding legacy strings to said legacy call control system; and
   an output adapter for (iv) said receiving of said resulting events and said corresponding legacy strings, (v), said identifying of said alternate strings, and (vi), said outputting of said resulting events and said alternate strings.

5. The system of claim 3 wherein said IP telephony switch includes:
   an IP telephony application,
   a device control,
   a switch management system,
   and a trunk,
   and wherein said adapter further comprises a plurality of clients for cooperating with said IP telephony application, said device control, said switch management system, and said trunk.

6. A method of adapting a legacy call control system for inputting incoming events and legacy strings and, in response, outputting resulting events and said legacy strings, said method comprising:
   i) inputting said incoming events and alternate strings into an adapter,
   ii) within said adapter generating said legacy strings, corresponding to said alternate strings,
   iii) within said adapter passing said incoming events and said corresponding legacy strings from said adapter to said legacy call control system,
   iv) within said adapter receiving, from said legacy call control system, said resulting events and said corresponding legacy strings,
   v) within said adapter identifying said alternate strings using said corresponding legacy strings received in step iv), and
   vi) within said adapter outputting said resulting events and said alternate strings.

7. The system of claim 2, wherein said adapter comprises:
   an input adapter for (i) said receiving of said incoming events and alternate strings, (ii) said generating of said legacy strips, and (iii) said passing of said incoming events and said corresponding legacy strings to said legacy call control system; and an output adapter for (iv) said receiving of said resulting events and said corresponding legacy strings, (v), said identifying of said alternate strings, and (vi), said outputting of said resulting events and said alternate strings.

8. The system of claim 3, wherein said adapter comprises:

an input adapter for (i) said receiving of said incoming events and alternate strings, (ii) said generating of said legacy strips, and (iii) said passing of said incoming events and said corresponding legacy strings to said legacy call control system; and an output adapter for (iv) said receiving of said resulting events and said corresponding legacy strings, (v), said identifying of said alternate strings, and (vi), said outputting of said resulting events and said alternate strings.

* * * * *